United States Patent [19]
Averbuch et al.

[11] Patent Number: 5,867,785
[45] Date of Patent: Feb. 2, 1999

[54] METHOD FOR PROVIDING COMMUNICATION SERVICE TO COMMUNICATION UNITS LOCATED WITHIN A COMMON CARRIER TRANSPORTATION DEVICE

[75] Inventors: Rod Averbuch; Israel A. Cimet, both of Buffalo Grove, Ill.

[73] Assignee: Motorola, Inc., Schaumburg, Ill.

[21] Appl. No.: 596,391

[22] Filed: Jan. 31, 1996

[51] Int. Cl.⁶ ..................................................... H04B 1/00
[52] U.S. Cl. ........................ 455/436; 455/441; 455/444; 455/509; 455/510; 455/524
[58] Field of Search .................. 455/34.1, 436, 455/438, 444, 441, 442, 440, 451, 452, 454, 507, 509, 448, 449, 433, 513, 450, 445, 510, 524

[56] References Cited

U.S. PATENT DOCUMENTS

| | | | |
|---|---|---|---|
| 5,345,499 | 9/1994 | Benveniste | 379/59 |
| 5,357,559 | 10/1994 | Kallin et al. | 379/59 |
| 5,375,123 | 12/1994 | Andersson et al. | 455/433 |
| 5,521,961 | 5/1996 | Fletcher et al. | 379/59 |
| 5,613,205 | 3/1997 | Dufour | 455/433 |
| 5,655,217 | 8/1997 | Lemson | 455/513 |
| 5,657,487 | 8/1997 | Doner | 455/456 |
| 5,659,882 | 8/1997 | Fukutomi | 455/524 |

*Primary Examiner*—Tommy P. Chin
*Assistant Examiner*—Anand Rao

[57] ABSTRACT

A communication system (100) employs a method and apparatus for providing communication service to communication units (207–213) located within a common carrier transportation device (115). A stationary system controller (101) allocates a first set of communication resources (e.g., 140–149) to a mobile system controller (200) located at the common carrier transportation device (115). The first set of communication resources (140–149) are a subset of the communication resources assigned to a first stationary base site (109) of multiple stationary base sites (102–112) controlled by the stationary controller (101). The mobile controller (200) maps the first set (140–149) to a second set of communication resources (220–229) for use within the common carrier transportation device (115). The second set (220–229) is distinct from the first set (140–149) and is preferably selected to not interfere substantially with communication resources assigned to the stationary base sites (102–112). The mobile controller (200) then allocates communication resources (e.g., 220–226) from the second set to support communications involving the communication units (207–213) located within the common carrier transportation device (115).

24 Claims, 9 Drawing Sheets

FIG.3

| MOBILE SITES RESOURCES | STATIONARY SITE RESOURCES |
|---|---|
| 220 | 142 |
| 221 | 144 |
| 222 | 147 |
| 223 | 149 |
| 224 | 140 |
| 225 | 141 |
| 226 | 145 |
| 227 | 143 |
| 228 | 148 |
| 229 | 146 |

301

MAPPING TABLE 300

FIG.5

| MOBILE SITES RESOURCES | STATIONARY SITE RESOURCES |
|---|---|
| 400 | 155 |
| 401 | 151 |
| 402 | 153 |
| 403 | 150 |
| 404 | 159 |
| 405 | 154 |
| 406 | 157 |
| 407 | 158 |
| 408 | 152 |
| 409 | 156 |

MAPPING TABLE 500

800

METHOD FOR PROVIDING COMMUNICATION SERVICE TO COMMUNICATION UNITS LOCATED WITHIN A COMMON CARRIER TRANSPORTATION DEVICE

FIELD OF THE INVENTION

The present invention relates generally to trunked communication systems and, in particular, to a method and apparatus for providing trunked communication service to communication units located within a common carrier transportation device.

BACKGROUND OF THE INVENTION

Trunked communication systems, such as cellular communication systems, are well known to include a fixed system controller, a plurality of fixed base sites, and a plurality of mobile subscriber units, such as radios, radiotelephones, or portable wireless data terminals. Each fixed base site is coupled to the fixed system controller through a wireline or microwave link and provides communication service to a respective service coverage area. The fixed system controller assigns a predetermined number of communication channels, or resources, to each fixed base site. When a mobile subscriber unit desires to communicate, the subscriber unit transmits a channel request via a control channel to the fixed base site serving the coverage area containing the subscriber unit. The base site forwards the request to the system controller and the system controller grants the channel request if at least one of the channels assigned to the base site is available. Upon granting, or allocation, of the channel, the system controller informs the subscriber unit of the allocation via the base site and establishes any necessary switching connections to connect the base site to another base site or a switching center that is coupled to the public switched telephone network (PSTN). Upon receiving the channel allocation, the subscriber unit begins transmitting and receiving its communication via the allocated channel.

If, during the communication, the subscriber unit travels, or is about to travel, into another service coverage area, the system controller detects this condition in accordance with known techniques and initiates a procedure to transfer, or handoff, the communication from the current channel to a new channel assigned to the base site (target base site) serving the coverage area that the subscriber unit has ventured, or is about to venture, into. The system controller selects the new channel and informs the subscriber unit of the new channel allocation via a transmission over the control channels of the original and target base sites.

In many metropolitan areas, common carrier transportation devices, such as trains, buses, and cars, are used to provide mass transportation to the populations of these areas. In such devices, many commuters may be using their mobile subscriber units simultaneously to participate in communications. Thus, when the common carrier device moves from one service coverage area to another in the cellular system, many handoffs must occur, in effect, simultaneously in order to allow the ongoing communications to continue. As noted above, each new channel allocation associated with a handoff is conveyed individually to each subscriber unit. Accordingly, in the mass commuter handoff situation, many control channels are needed simultaneously to perform the required number of handoffs. However, each fixed base site is assigned a fixed number of control channels and, at the time of mass handoff, may have less than the fixed number of control channels available for use by the mobile subscriber units. Therefore, when the number of subscriber units to be handed off exceeds the number of available control channels, the fixed system controller drops, or disconnects, the communications of the excess subscriber units. Consequently, as described, mass handoff in existing cellular systems is a low reliability operation.

Therefore, a need exists for a method and apparatus for providing communication service to communication units located in a common carrier transportation device that provides highly reliable communication service to a large number of mobile subscriber units that are simultaneously communicating while traveling in the common carrier transportation device. Further, such a method and apparatus that substantially reduces control channel activity during a mass handoff would be an improvement over the prior art.

BRIEF DESCRIPTION OF THE DRAWINGS

FIG. 3 illustrates a table for mapping communication resources in accordance with the present invention.

FIG. 5 illustrates a table for mapping communication resources subsequent to the handoff of the common carrier transportation device depicted in FIG. 4.

DESCRIPTION OF A PREFERRED EMBODIMENT

Generally, the present invention encompasses a method and apparatus for providing communication service to communication units located within a common carrier transportation device. A stationary system controller allocates a first set of communication resources to a mobile system controller located at the common carrier transportation device. The first set of communication resources are a subset of the communication resources assigned to a first stationary base site of a plurality of stationary base sites controlled by the stationary system controller. The mobile system controller then maps the first set of communication resources to a second set of communication resources for use within the common carrier transportation device. The second set of communication resources is distinct from the first set of communication resources and is preferably selected to not interfere substantially with the communication resources assigned to the stationary base sites. The mobile system controller then allocates communication resources from the second set of communication resources to support communications involving the communication units located within the common carrier transportation device.

By providing communication service in this manner, the present invention permits simultaneous group handoff of the communication resources allocated to the mobile system controller when the common carrier transportation device travels into a service coverage area of a stationary base site that is adjacent to the first stationary base site. Group handoff, as contemplated by the present invention, can be accomplished through communication between the mobile system controller and the stationary system controller over a single control channel, as opposed to requiring multiple control channels as in existing cellular systems. In addition, by anticipating a group handoff, the present invention allows the stationary system controller to establish necessary switching connections prior to the handoff, thereby equalizing the switching load on the system controller during handoff. This equalization is in sharp contrast to the undesirable loading surge that results from the communication unit-by-communication unit handoff process utilized in current handoff techniques.

Figure 1:
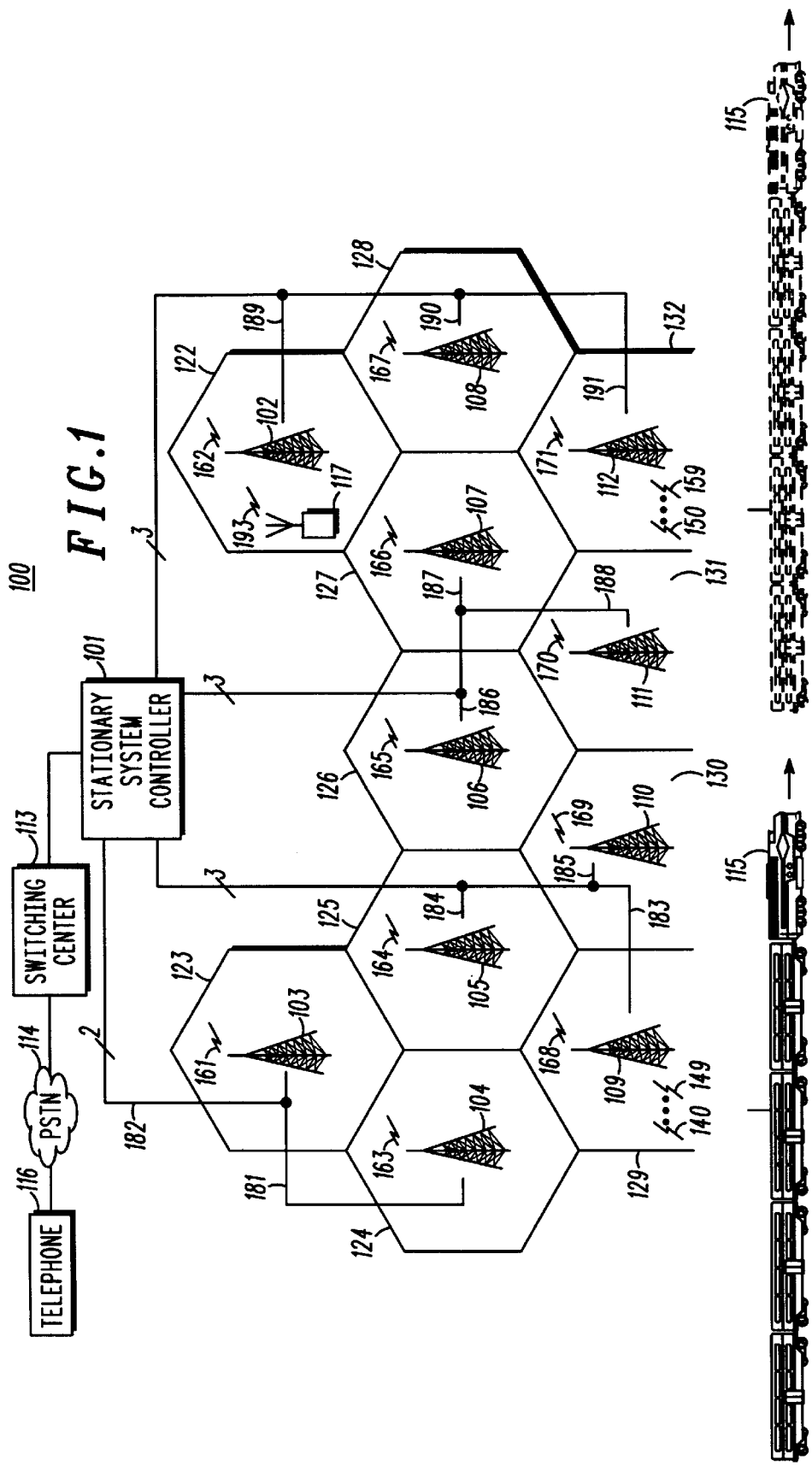
FIG. 1 illustrates a block diagram of an exemplary radio communication system in accordance with the present invention.

The present invention can be more fully described with reference to FIGS. 1–8. FIG. 1 illustrates a block diagram of an exemplary radio communication system 100 in accordance with the present invention. The communication system 100 includes a stationary system controller 101, a plurality of stationary base sites 102–112, a switching center 113, and a common carrier transportation device 115. Each stationary base site 102–112 provides communication service to communication units (e.g., 117) located within a respective service coverage area 122–132. The stationary base sites 102–112 are coupled to the stationary system controller 101 via respective communication links 181–191, such as T1 wireline links, fiber optic links, microwave links, or radio frequency (RF) links. The stationary system controller 101 is coupled to the switching center 113, which is preferably coupled to the public switched telephone network (PSTN) 114 to permit the stationary system controller 101 to facilitate a communication between a radio communication unit (e.g., 117), such as a mobile or portable radio or radiotelephone, and a PSTN subscriber, such as a telephone 116, facsimile, or computer.

The stationary system controller 101 preferably comprises an "iDEN" Base Site Controller that is commercially available from Motorola, Inc. The stationary base sites 102–112 are well known in the art and preferably support one or more trunking communication platforms, such as frequency division multiple access (FDMA), time division multiple access (TDMA), or code division multiple access (CDMA). In a preferred embodiment, the stationary base sites 102–112 comprise "iDEN" Enhanced Base Transceiver Sites, which are also available from Motorola, Inc. The switching center 113 preferably comprises a DMS-MSC cellular telephone switch manufactured by Northern Telecom, Inc.

The common carrier transportation device 115 comprises any apparatus that transports multiple communication units. In the exemplary embodiment depicted in FIG. 1, the common carrier transportation device 115 comprises a commuter train. However, in an alternate embodiment, the common carrier transportation device 115 might comprise a car, a van, or a bus.

Figure 2:
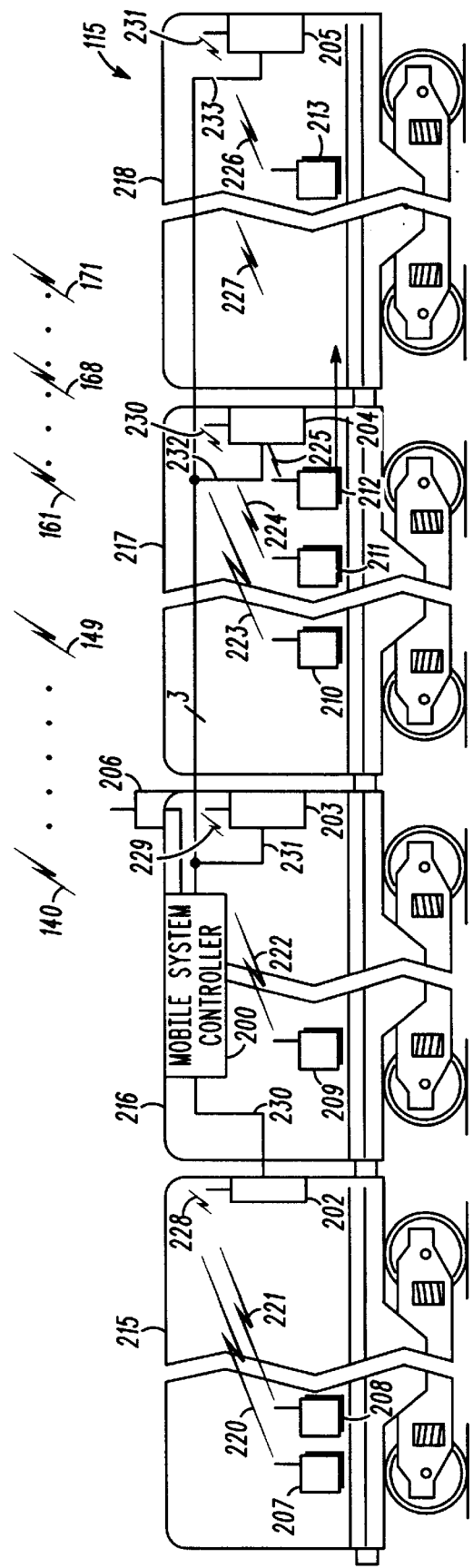
FIG. 2 illustrates a block diagram of a portion of the radio communication system of FIG. 1 that is located in a common carrier transportation device in accordance with the present invention.

The exemplary common carrier transportation device 115 is depicted in greater detail in FIG. 2. As shown, the common carrier transportation device 115 includes a mobile system controller 200, a plurality of mobile base sites 202–205, and a plurality of mobile communication units 207–213. Each mobile base site 202–205 provides communication service to a respective service coverage area 215–218 within the common carrier transportation device 115 and is coupled to the mobile system controller 200 via a corresponding communication link 230–233. The mobile system controller 200 is also coupled to a repeater or base station 206 to permit the mobile system controller 200 to communicate with the stationary system controller 101 via the stationary base site (e.g., 109) serving the coverage area (e.g., 129) currently containing the common carrier transportation device 115. It should be noted that where the common carrier transportation device 115 is something smaller than a train (e.g., a car, a van, or a bus), the complete service coverage area within the common carrier transportation device might be supported adequately through the use of a single mobile base site.

Like its stationary counterpart, the mobile system controller 200 preferably comprises a controller using the Motorola "iDEN" Base Site Controller platform. Similarly, the mobile base sites 202–203 and base station 206 preferably utilize the Motorola "iDEN" Enhanced Base Transceiver Site platform. Although the base station 206 and the mobile system controller 200 are depicted in FIG. 2 as separate entities, a skilled artisan will recognize that the functionality of the base station 206 and the mobile system controller 200 may be combined into a single mobile infrastructure device. The mobile communication units 207–213 comprise radio communication devices, such as mobile or portable radios, radiotelephones, or wireless data terminals.

Operation of the exemplary radio communication system 100 when the common carrier transportation device 115 is located within a particular service coverage area 129 can be more fully understood with reference to FIGS. 1–3. It is assumed for the purposes of this discussion that the common carrier transportation device 115 begins its trip in the coverage area 129 served by stationary base site 109. Upon power-up, the mobile system controller 200 registers with the stationary system controller 101 by scanning for a control channel and, upon identifying the control channel 168 having the strongest signal or best signal quality, transmitting a registration message to the stationary system controller 101 via the stationary base site 109 associated with the identified control channel 168.

Upon receiving the registration message, the stationary system controller 101 allocates a set of communication resources 140–149, or channels, to the mobile system controller 200. In a preferred embodiment, the allocated communication resources 140–149 comprise time slots of one or more RF carriers in accordance with known TDMA and FDMA techniques. The set of communication resources allocated by the stationary system controller 101 preferably comprises a subset of the communication resources assigned by the stationary system controller 101 to the stationary base site that received the mobile system controller's registration. Thus, while the common carrier transportation device 115 is located within the service coverage area 129 of stationary base site 109, the communication resources 140–149 allocated to the mobile system controller 200 are a subset of the communication resources assigned to stationary base site 109. The stationary system controller 101 transmits the resource allocation to the mobile system controller 200 over control channel 168 via stationary base site 109 and base station 206.

Upon receiving the resource allocation from the stationary system controller 101, the mobile system controller 200 maps the allocated resources 140–149 to a local set of communication resources (e.g., 220–229) for use by the communication units 207–213 located within the common carrier transportation device 115. The local set of resources 220–229 (only resources 220–226 are shown in FIG. 2 to coincide with the number of communicating communication units 207–213) are selected to be distinct from the resources 140–149 allocated by the stationary system controller 101 to the current serving stationary base site 109 in order to mitigate interference between transmissions within the common carrier transportation device 115 and transmissions between the mobile system controller 200 and the current serving stationary base site 109. For example, the stationary system controller 101 might transmit the identification of stationary base site 109 together with the resource allocation and a list of resources allocated to stationary base site 109 to the mobile system controller 200. Responsive to receiving the list, the mobile system controller 200 selects a local set of resources, such that the resources in the local set do not substantially interfere with any of the resources in the received list, thereby mitigating the probability that transmissions within the common carrier transportation device 115 will interfere with transmissions between the mobile system controller 200 and the current serving stationary base site 109. In a preferred embodiment, the selection of the local set comprises choosing local resources that are neither identical to, nor adjacent to, a listed resource. In an alternate embodiment, the selection of the local set might comprise choosing local resources that are even farther removed from the listed resources than simply being non-adjacent in order to limit the energy produced within the common carrier transportation device at any particular listed resource to substantially less (e.g., 20–30 decibels (dB) less) than a desired transmission at the particular listed resource.

In the alternative, the stationary system controller 101 might transmit the identification of stationary base site 109 together with the resource allocation only to the mobile system controller 200. In this case, the mobile system controller 200 consults a prestored database that lists the communication resources assigned to the stationary base sites (e.g., 109–113). Upon consulting the prestored list, the mobile system controller 200 then selects resources that are neither identical to, nor adjacent to, any of the resources assigned to the current serving stationary base site 109.

In addition, the local set of resources 220–229 may be further selected to mitigate interference between transmissions within the common carrier transportation device 115 and transmissions involving any stationary base site 102–113. In a preferred embodiment, the mobile system controller 200 selects the local set of communication resources 220–229 such that the selected resources 220–229, when used, do not substantially interfere with communication resources allocated to any of the stationary base sites 102–113. In the preferred embodiment, the mobile system controller 200 periodically scans the control channels 161–171 of the stationary base sites 102–113 and receives the control signals contained therein. The mobile system controller 200 then measures the received signal quality of each of the control signals using one of a variety of known techniques, such as received signal strength indication (RSSI), bit error rate (BER), word error rate (WER), or carrier-to-interference plus noise ratio (C/I+N). Upon completing the measurements, the mobile system controller 200 compares the measurements to a predetermined threshold (e.g., C/I+N=18 dB) and selects the local set of resources 220–229, such that the selected resources do not substantially interfere with communication resources assigned to stationary base sites that produce control signals having signal quality measurements that exceed, or at least are of higher quality than, the threshold. As a result of this threshold comparison process, the mobile system controller 200 preferably selects the local set of resources 220–229 to be a subset of the communication resources assigned to a single stationary base site (e.g., 102) or a combination of communication resources assigned to a plurality of stationary base sites (e.g., 102, 108, 112).

Upon selecting the local set of resources 220–229, the mobile system controller 200 stores the mapping between the local set of resources 220–229 and the set of resources 140–149 allocated by the stationary system controller 115 in a mapping table, such as the mapping table 300 depicted in FIG. 3. Each entry 301 of the mapping table 300 correlates a local communication resource (i.e., a resource used within the common carrier transportation device 115) with a communication resource conveyed between the mobile system controller 200 and the current serving stationary base site 109. For example, based on the exemplary mapping table 300 illustrated in FIG. 3, when communication resource 223 is used to convey a communication between a mobile communication unit 210 and the mobile system controller 200, the mobile system controller 200 uses communication resource 149 to convey the same communication to the stationary system controller 101.

Once the local set of communication resources 220–229 is stored, the mobile system controller 200 distributes the local set of communication resources 220–229 among the mobile base sites 202–205. For example, the mobile system controller 200 might distribute three communication resources each to mobile base sites 202, 203, and 205, and four communication resources to mobile base site 204.

The mobile communication units 207–213 register with the mobile system controller 200 and request communication resources in accordance with known call request techniques; thus, no further discussion will be presented except to facilitate an understanding of the present invention. In response to the requests, the mobile system controller 200 allocates a local communication resource 220–226 to each requesting mobile communication unit 207–213 (provided the number of requesting communication units does not exceed the number of available local resources) to support the communications from the requesting communication units 207–213. The allocation of the local communication resources 220–226 to the mobile communication units 207–213 is conveyed to the mobile communication units 207–213 via local control channels 228–231.

Upon being allocated a respective local communication resource 220–226, each mobile communication unit 207–213 conveys its communication to the mobile system controller 200 over the allocated communication resource 220–226 via a mobile base site 202–205. For example, as illustrated in FIG. 2, mobile communication units 207 and 208 convey their communications to the mobile system controller 200 via communication resources 220 and 221, respectively, and mobile base site 202. Similarly, mobile communication units 209 and 213 convey their communications to the mobile system controller 200 via communication resources 222 and 226, and mobile base sites 203 and 205, respectively. Finally, mobile communication units 210–212 convey their communications to the mobile system controller 200 via communication resources 223–225, respectively, and mobile base site 204. The mobile system controller 200 then transmits the communications, either separately or grouped together, to the stationary system controller 101 via a corresponding number of the allocated set of communication resources 140–149 and the current serving stationary base site 109. The communication resources 140–146 utilized in the mobile system controller's transmissions are defined by the entries 301 in the mapping table 300.

Upon receiving the communications from the mobile system controller 200, the stationary system controller 101 provides each communication to a respective target. For example, if the target is a PSTN subscriber's telephone 116, the stationary system controller 101 establishes the switching connection between itself and the switching center 113 and then forwards the communication to the switching center 113 for eventual delivery to the telephone 116 via the PSTN 114. In the alternative, if the target is another mobile communication unit 117, the stationary system controller 101 first establishes the switching connection between itself and the stationary base site 102 serving the target communication unit 117 and then forwards the communication to the target stationary base site 102 for eventual delivery to the target communication unit 117 via a communication resource 193.

Communications from the stationary system controller 101 to the mobile system controller 200, and eventually to the mobile communication units 207–213, occur in a manner analogous, but opposite, to the manner in which communications are conveyed from the mobile communication units 207–213 to the stationary system controller 101. For example, in a communication from the stationary system controller 101 to mobile communication unit 207, the stationary system controller 101 provides the communication to the currently serving stationary base site 109. The stationary base site 109 then transmits the communication to the mobile system controller 200 via the allocated communication resource 142 that provides the proper mapping at the mobile system controller 200. The stationary system controller 101 can maintain the proper mapping either by receiving a copy of the mapping table 300 from the mobile system controller 200 over the control channel 168 or by assigning communication resources at the stationary base site 109 based on mobile communication unit identification, as is currently performed in existing cellular telephone systems. Once the mobile system controller 200 receives the communication intended for the mobile communication unit 207, the mobile system controller 200 provides the communication to the appropriate serving mobile base site 202 and instructs the serving mobile base site 202 to transmit the communication to the mobile communication unit 207 via a communication resource 220 selected pursuant to the entries 301 in the mapping table 300.

In the event that a mobile communication unit (e.g., 212) moves from the service coverage area 217 of one mobile base site 204 to the service coverage area 218 of another mobile base site 205 during a communication (e.g., due to the mobile communication unit's user walking from one train car to another), the mobile system controller 200 determines whether the moving mobile communication unit 212 is to be handed off—e.g., by measuring and comparing received signal quality of the communication to a handoff threshold in accordance with known techniques. Once the mobile system controller 200 determines that a local handoff is necessary (e.g., when the received signal quality of the communication degrades below the handoff threshold), the mobile system controller 200 allocates a new communication resource 227 at the target mobile base site 205 and instructs the moving mobile communication unit 212 to begin transmitting and receiving the communication via the newly allocated communication resource 227. As with the other local communication resources 220–226, the newly allocated communication resource 227 is a resource selected from the entries 301 in the mapping table 300. The local handoff procedure within the common carrier transportation device 115 is substantially similar to the handoff procedure currently used in many existing trunked radiotelephone systems.

As the common carrier transportation device 115 travels along its designated route, the ongoing communications involving the mobile communication units 207–213 may have to be handed off from one stationary base site (e.g., 109) to another stationary base site (e.g., 110). In existing radiotelephone systems, there is no mobile system controller, so each mobile communication unit communicates directly with the stationary system controller 101 via a communication resource. Since the common carrier transportation device 115 is often traveling at high speeds, the stationary system controller 101 is instantly overwhelmed with handoff activity as the common carrier transportation device 115 approaches and then enters a new service coverage area. The stationary system controller 101 becomes overwhelmed because the stationary base sites (original and target) associated with the handoffs do not have a sufficient number of control channels to convey the handoff information to the mobile communication units. In addition, the stationary system controller 101 must individually establish new switching connections for each ongoing communication involving mobile communication units located at the common carrier transportation device 115. This surge in switching and control channel activity can result in dropped communications due to the lack of control channels and the stationary system controller's inability to handle the effectively instant switching requirements of a mass handoff. The present invention overcomes these existing mass handoff deficiencies.

With the present invention, the stationary system controller 101 is pre-programmed with the geographic layout of the radio communication system 100; thus, the stationary system controller 101 knows, or can easily determine, which stationary base sites serve adjacent service coverage areas. Therefore, once the stationary system controller 101 determines the direction of travel for the common carrier transportation device 115 and the need for the ongoing communications from the mobile system controller 200 to be handed off, the stationary system controller 101 can establish all necessary switching connections between the stationary system controller 101 and a target stationary base site or a switching center 113 prior to the handoff. In a preferred embodiment, the stationary system controller 101 is preprogrammed with the travel path of the common carrier transportation device 115. In addition, the stationary system controller 101 maintains a history (e.g., a counter) of traversed service coverage areas. Thus, by consulting the travel path and history information, the stationary system controller 101 preferably determines the common carrier transportation device's direction of travel. For example, if the common carrier transportation device 115 is currently in service coverage area 131 and, as indicated by the history information, has passed once through service coverage area 130 and twice through service coverage area 132, the stationary system controller 101 determines that the direction of travel of the common carrier transportation device 115 is toward service coverage area 130. By establishing the switching connections prior to the handoff, the stationary system controller 101 mitigates the surge in switching requirements, thereby reducing the probability of a dropped call during handoff.

Figure 4:
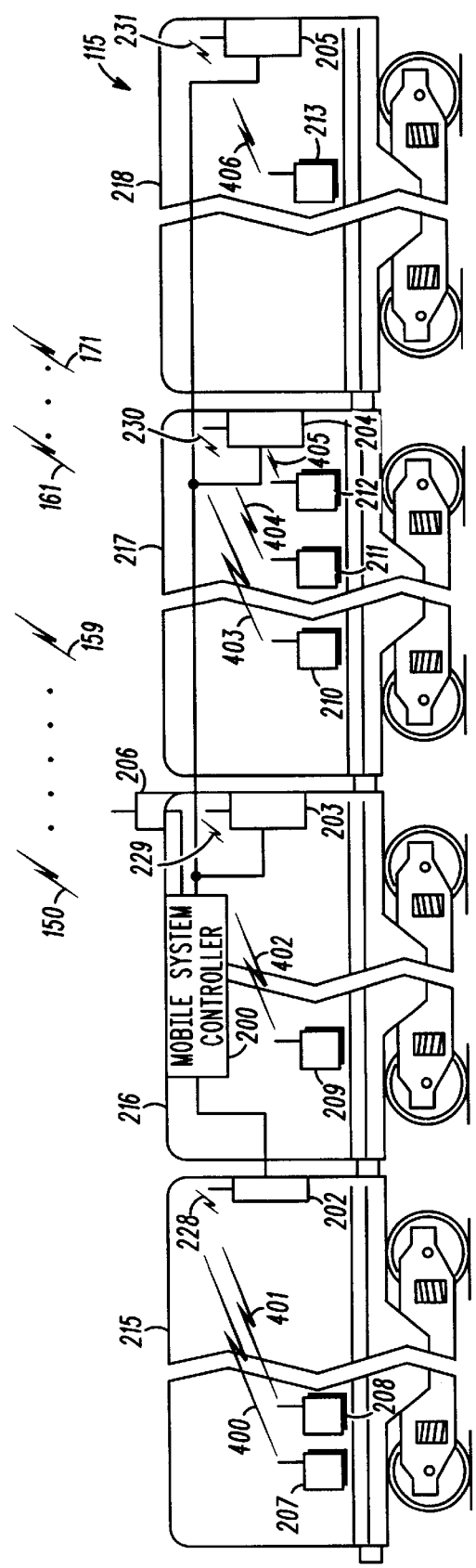
FIG. 4 illustrates a block diagram of the portion of the radio communication system of FIG. 2 subsequent to a handoff of the common carrier transportation device in accordance with the present invention.

Handoff of ongoing communications, and the reallocation of resources associated therewith, due to the movement of the common carrier transportation device 115 can be more fully understood with reference to FIGS. 1, 4, and 5. When the common carrier transportation device 115 approaches a new service coverage area (e.g., 132), the stationary system controller 101 alone, or in combination with the mobile system controller 200, determines whether a handoff is necessary. This determination can be accomplished using well-known mobile assisted handoff (MAHO) techniques. When a handoff is necessary, the stationary system controller 101 allocates a new set of communication resources (e.g., 150–159) for the mobile system controller 200 at the stationary base site 112 serving the target service coverage area 132 (i.e., the target stationary base site). The new set of communication resources 150–159 preferably comprises a subset of the communication resources assigned to the target stationary base site 112.

In addition, as mentioned above, the stationary system controller 101 establishes any necessary switching connections prior to the actual handoff. The stationary system controller 101 then conveys the new resource allocations to the mobile system controller 200 via a control channel (e.g., 170 or 171) to thereby hand off all ongoing communications between the mobile system controller 200 and the stationary system controller 101 substantially simultaneously. By performing a group handoff as described above, the stationary system controller 101 utilizes only one control channel (or two control channels in the case of redundant transmission from the target stationary base site) to complete the group handoff, as compared with the utilization of multiple control channels (seven in the case depicted in FIG. 4) as in existing handoff techniques.

Upon receiving the allocation of the new set of communication resources, the mobile system controller 200 maps the new set to either the current local set (e.g., 220–229) or a new local set (e.g., 400–409) depending upon whether the current local set will substantially interfere with any stationary base site communication resources, as discussed above with regard to FIGS. 1–3. When the current local set will not substantially interfere with stationary base site communication resources, the mobile system controller 200 maps the new set 150–159 allocated by the stationary system controller 101 to the current local set 220–229. However, when the current local set will substantially interfere with any stationary base site communication resources, the mobile system controller 200 maps the new set 150–159 allocated by the stationary system controller 101 to the new local set 400–409 (only resources 400–406 are shown in FIG. 4 to coincide with the number of communicating communication units 207–213). The new local set 400–409 is distinct from the new set 150–159 allocated by the stationary system controller 101 and preferably does not substantially interfere with any stationary base site communication resources. As discussed above with regard to local set 220–229, the new local communication resources 400–409 preferably comprise either a subset of communication resources assigned to a distant stationary base site (e.g., stationary base site 103 when the common carrier transportation device 115 is located in service coverage area 132) or a subset of communication resources assigned to multiple distant stationary base sites.

For example, when the common carrier transportation device 115 moves from service coverage area 129 to service coverage area 130 and the mobile system controller 200 is handed off from stationary base site 109 to stationary base site 110, the mobile system controller 200 preferably maintains the current local set of communication resources 220–229 after handoff if the current local set 220–229 is a subset of communication resources assigned to stationary base site 102 and the received signal quality of the control signal transmitted from stationary base site 102 via its assigned control channel 162 is below a threshold. However, when the common carrier transportation device 115 is handed off from stationary base site 111 to stationary base site 112 and the received signal quality of the control signal transmitted from stationary base site 102 is above the threshold, the mobile system controller 200 preferably selects a new local set of communication resources 400–409 (e.g., a subset of the communication resources assigned to stationary base site 103) that do not substantially interfere with the communication resources assigned to the stationary base sites.

FIG. 5 illustrates a mapping table 500 generated by the mobile system controller 200 for use subsequent to the handoff of the mobile system controller 200 from stationary base site 111 to stationary base site 112. The mapping table 500 displays the mapping of the new set of communication resources 150–159 allocated by the stationary system controller 101 to a new local set of communication resources 400–409 for use within the common carrier transportation device 115. Each entry 501 in the mapping table 500 associates a new communication resource (e.g., 155) allocated by the stationary system controller 101 with a new local communication resource (e.g., 400). Thus, this mapping table 500 exemplifies a table that would be generated when the current (i.e., pre-handoff) local set of communication resources at the common carrier transportation device 115 substantially interferes with stationary base site communication resources after handoff. If the current local set of communication resources did not substantially interfere with stationary base site communication resources after handoff, the list of mobile site resources in mapping table 500 (i.e., resources 400–409) would be replaced with a list of the current local communication resources (e.g., 220–229).

Upon handoff from one stationary base site to another (including allocation of the new set of resources by the stationary system controller 101 and generation of the mapping table 500 by the mobile system controller 200) and reselection of the local communication resources 400–409 at the common carrier transportation device 115, the mobile system controller 200 distributes the newly selected local communication resources 400–409 to the mobile base sites 202–205 and provides the mobile communication units (e.g., 207–213) involved in ongoing communications with updated communication resource allocations via the local control channels 228–231. The mobile communication units 207–213, upon receiving the new local resource allocations, transmit their communications to the mobile system controller 200 via the newly allocated resources 400–406. The mobile system controller 200 then converts the received local resources 400–406 to corresponding newly allocated stationary site resources 150–159 in accordance with the entries 501 in the updated mapping table 500, and transmits the communications to the stationary system controller 101 via the newly allocated stationary site resources 150–159.

Figure 6:
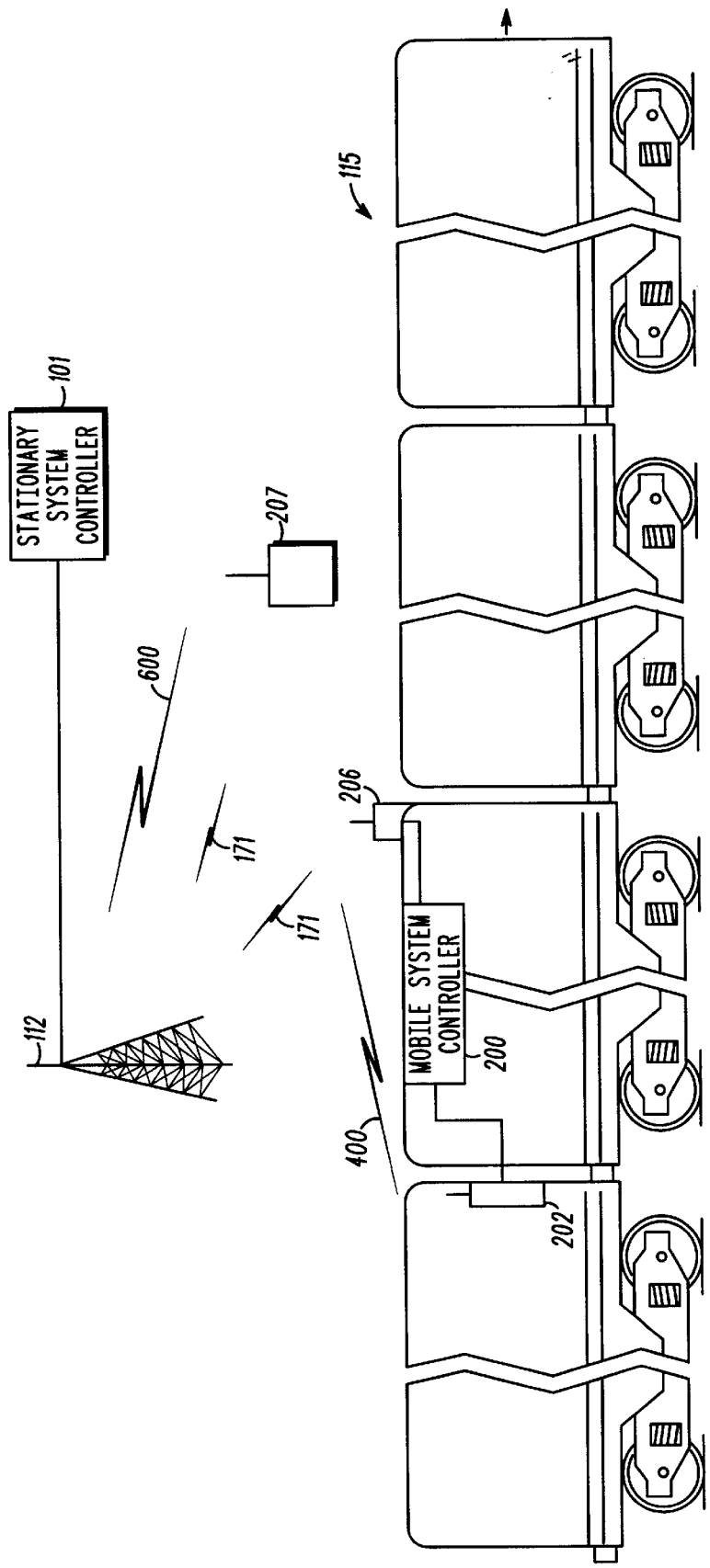
FIG. 6 illustrates a block diagram of a portion of the radio communication system of FIG. 1 subsequent to handoff of a communication unit to a stationary base site in accordance with the present invention.

In addition to the handoff of mobile communication units within the common carrier transportation device 115 and handoff of the mobile system controller 200 from stationary base site to stationary base site, the present invention also provides for the handoff of a mobile communication unit (e.g.; 207) from the mobile system controller 200 to a stationary base site (e.g., 112). Such a situation, which might occur due to a mobile communication unit's user getting off of a train at a train stop, is depicted in FIG. 6. During the communication, the mobile system controller 200 monitors the received signal quality of the mobile communication unit's transmission. When the mobile communication unit 207 exits the common carrier transportation device 115, the mobile system controller 200 detects the reduction in received signal quality as the common carrier transportation device 115 leaves the location at which the mobile communication unit 207 exited. When the received signal quality degrades below a threshold, the mobile system controller 200 determines whether the mobile communication unit 207 should be handed off to another mobile base site within the common carrier transportation device 115. This determination is preferably accomplished, as described above with regard to FIG. 2, by using MAHO techniques to determine the appropriate target mobile base site.

However, if the MAHO techniques do not provide an appropriate handoff mobile base site and the mobile system controller 200 has not received an end of message notification from the mobile communication unit 207, the mobile system controller 200 sends a request to the stationary system controller 101 via a control channel (e.g., 171) asking the stationary system controller 101 to scan for a possible handoff. The stationary system controller 101 then instructs the stationary base site 112 to scan for a transmission by the mobile communication unit 207 on the communication resource 400 the mobile communication unit 207 had been using within the common carrier transportation device 115. Upon detecting a transmission, the stationary system controller 101 allocates a new communication resource 600 to the mobile communication unit 207 and informs the mobile communication unit 207 of the new allocation via the control channel 171. Upon receiving the new allocation, the mobile communication unit 207 transmits the communication to the stationary system controller 101 via the newly allocated communication resource 600. The processes described above with regard to FIGS. 1–6 preferably continue throughout the duration of the common carrier transportation device's travels.

As described above with regard to FIGS. 1–6, the present invention provides a technique for providing reliable and continuous communication service to communication units located in a common carrier transportation device, such as a bus or a train. The present invention effectively provides a communication subsystem at the common carrier transportation device that utilizes and controls a subset of communication resources assigned to a stationary base site in the overall system. The subsystem controller maps the assigned subset of resources to a local set of resources for use within the common carrier transportation device, such that the local set does not cause interference within the overall system. By creating such a subsystem and assigning a pre-established group of communication resources to the subsystem, the present invention allows the stationary system controller to know, prior to handoff, which group of resources must be switched and provides for conveyance of the handoff control information via a single control channel to the subsystem controller. Thus, the present invention permits minimal control channel activity during handoff and allows the stationary system controller to establish, prior to handoff, the switching connections necessary for continuation of existing mobile communications, thereby substantially reducing the switching and control channel load surge that currently accompanies the handoff of mobile commuters in existing trunked communication systems.

Figure 7:
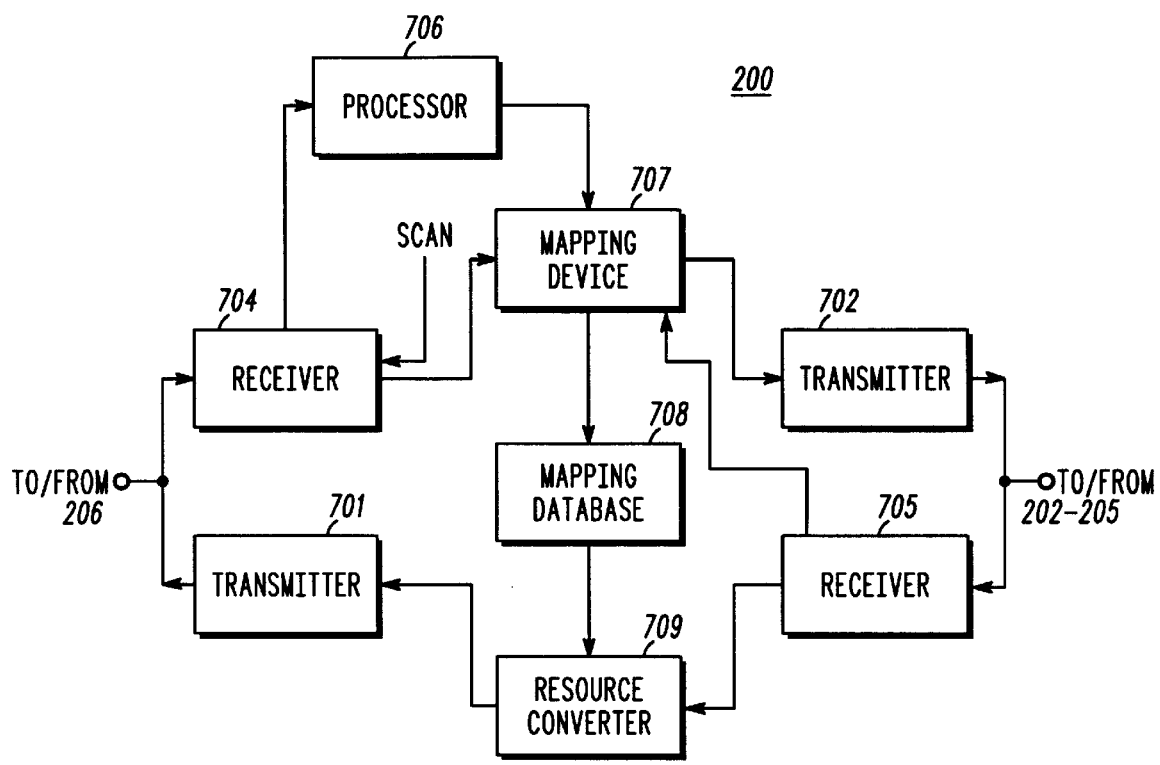
FIG. 7 illustrates a block diagram of a mobile system controller in accordance with a preferred embodiment of the present invention.

FIG. 7 illustrates a block diagram of the mobile system controller 200 in accordance with a preferred embodiment of the present invention. The mobile system controller 200 includes a plurality of transmitters 701, 702, a plurality of receivers 704, 705, a processor 706, a mapping device 707, a mapping database 708, and a resource converter 709. The transmitters 701, 702 and receivers 704, 705 are well-known and are preferably capable of transmitting and receiving TDMA signals over RF carriers. The processor 706 preferably comprises a microprocessor or a digital signal processor (DSP). The mapping device 707 and the resource converter 709 are preferably implemented as software routines running on the processor 706, but are depicted separately in FIG. 7 for the sake of clarity. The mapping database 708 comprises random access memory (RAM) or any other volatile form of memory.

Operation of the mobile system controller 200 occurs substantially as follows in accordance with the preferred embodiment of the present invention. Upon power up, or at such other times as may be appropriate (e.g., handoff), receiver 704 receives an allocation of a first set of resources from the stationary system controller (not shown). The first set of communication resources comprise a subset of resources assigned to a stationary base site controlled by the stationary system controller and are to be used for communications between the mobile system controller 200 and the stationary system controller. Receiver 704 provides the allocation to the mapping device 707, which maps the first set of communication resources to a second set of communication resources to be used within the common carrier transportation device. The second set of communication resources are selected such that they do not substantially interfere with any stationary base site communication resources.

In the preferred embodiment, as part of the second set selection process, receiver 704 is instructed—e.g., by the processor 706 or some other controlling device (not shown) —to receive (scan) control signals transmitted by the stationary base sites. The received control signals are then provided to the processor 706. The processor 706 measures the signal quality (e.g., BER or C/(I+N)) of each received control signal and compares the signal qualities to a predetermined threshold (e.g., a C/(I+N) of 18 dB) to identify which control signals have unacceptable signal quality. Control signals having received signal qualities above the threshold are considered to have acceptable signal quality; whereas, control signals having received signal qualities below the threshold are considered to have unacceptable signal quality. The processor 706 then selects a subset of communication resources from one or more stationary base sites associated with a control signal, or signals, having unacceptable signal quality. In the preferred embodiment, the processor 706 includes a lookup table that associates each control signal with each stationary base site and each stationary base site's assigned communication resources. Upon determining which control signals have unacceptable signal quality, the processor 706 selects the second set of communication resources from the lookup table by choosing resources that are assigned to the stationary base sites that are associated with the poor quality control signals. The number of resources selected for the second set preferably equals the number of resources in the first set.

The processor provides the selected set of resources to the mapping device 707 and the mapping device 707 associates the first set of communication resources with the second set of communication resources, such that each resource in the first set has a corresponding resource in the second set. The mapping device 707 then stores the resource mappings in the mapping database 708.

Upon receiving a request to communicate from a communication unit located in the common carrier transportation device, receiver 705, or another controlling device, instructs the mapping device 707 to allocate a communication resource in each of the first and second sets to the communication unit. The mapping device 707 then provides the allocation of the resource in the second set to transmitter 702, which transmits the allocation to the communication unit.

Upon receiving the allocation, the communication unit transmits its communication to receiver 705 via the allocated resource in the second set and one of the mobile base sites 202–205 located within the common carrier transportation device. The receiver 705 receives the communication and provides the communication to the resource converter 709. The resource converter 709 consults the resource mappings in the mapping database 708 and extracts the communication resource in the first set that maps to the received communication resource in the second set. The resource converter 709 then transfers the communication from the communication resource in the second set to the corresponding resource in the first set. The transfer of the communication from the resource in the second set to the resource in the first set is accomplished by extracting the communication (voice or data) through demodulation of the resource in the second set and then modulating the communication onto, or into, a resource of the first set in accordance with known modulation and demodulation techniques. The resource converter 709 provides the communication to transmitter 701, which transmits the communication to the stationary system controller via the resource in the first set and base station 206.

Figure 8A:
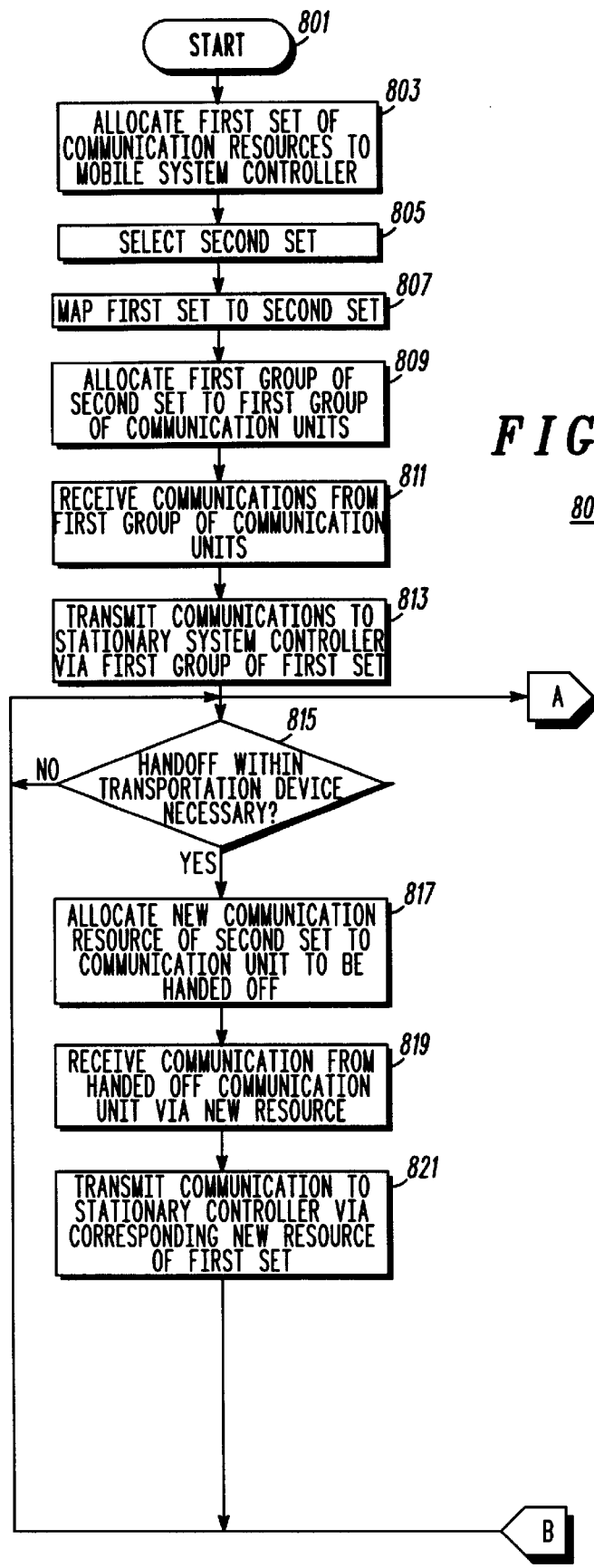
FIGS. 8A and 8B illustrate a logic flow diagram of steps executed to provide communication service to communication units located in a common carrier transportation device in accordance with the present invention.
Figure 8B:
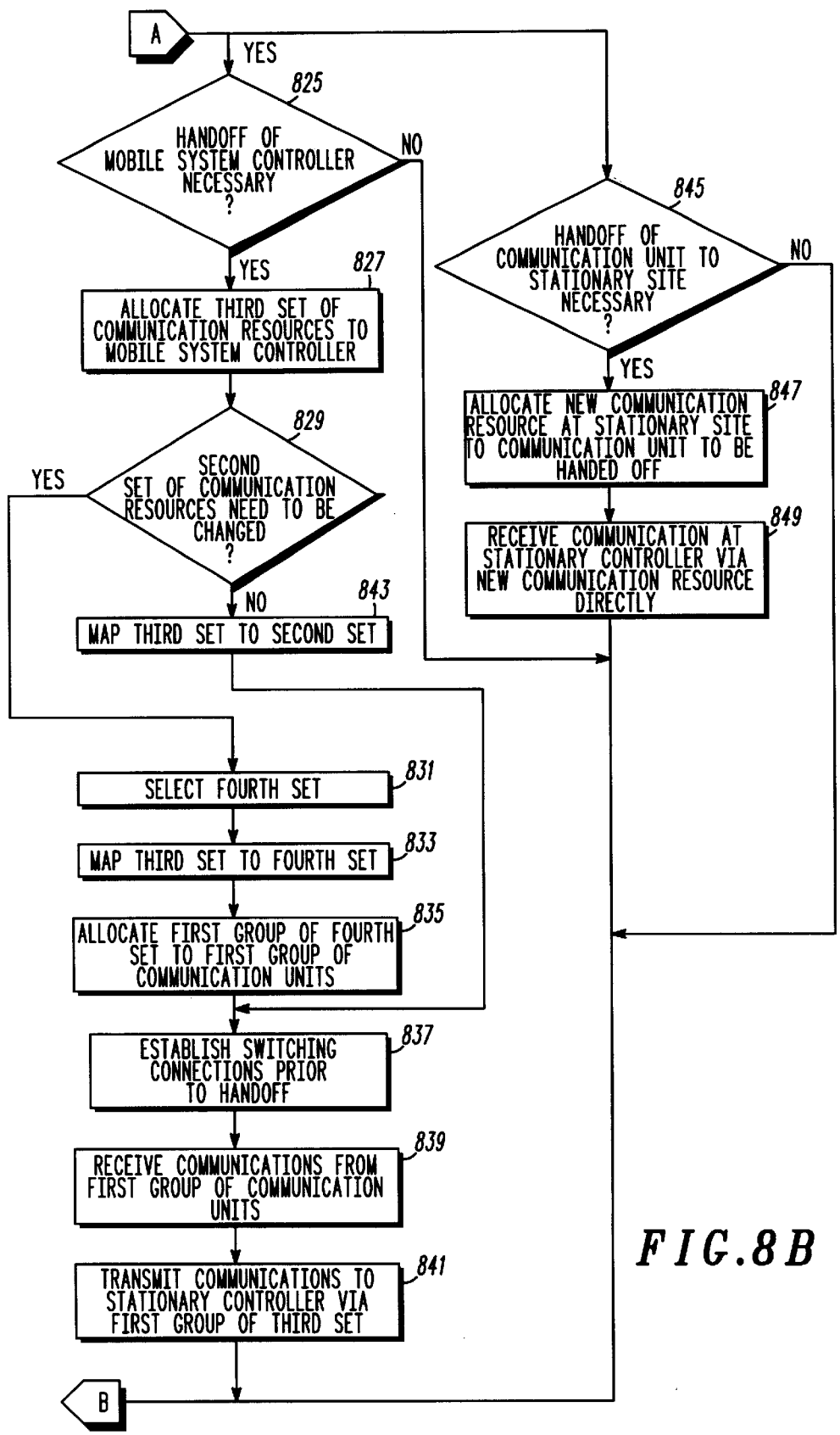

FIGS. 8A and 8B illustrate a logic flow diagram 800 of steps executed to provide communication service to communication units located in a common carrier transportation device in accordance with the present invention. The logic flow begins (801) when the stationary system controller allocates (803) a first set of communication resources to the mobile system controller at the common carrier transportation device. The first set of communication resources are a subset of communication resources assigned by the stationary system controller to a first stationary base site of a plurality of stationary base sites controlled by the stationary system controller.

Upon receiving the allocation of the first set of communication resources, the mobile system controller selects (805) a second, or local, set of communication resources for use by the mobile communication units located within the common carrier transportation device. The mobile system controller preferably determines the local set by receiving (scanning) the control signals of the stationary base sites, comparing the received signal quality of the control signals to a predetermined threshold, and then selecting a subset of the communication resources assigned to the stationary base site, or base sites, associated with the control signal, or signals, having received signal quality below the predetermined threshold. Thus, the local set of communication resources may be a subset of the communication resources assigned to a single stationary base site or multiple stationary base sites. Further, by selecting the local set based on received signal quality of the control signals, the mobile system controller chooses local communication resources that do not substantially interfere with communication resources being used by the stationary base sites to support communications by other communication units (i.e., communication units not located within the common carrier communication device).

After selecting the local set of communication resources, the mobile system controller maps (807) the first set to the local, or second, set. The mapping preferably associates each local resource, on a one-to-one basis, with a corresponding resource allocated to the mobile system controller by the stationary system controller. In the preferred embodiment, the mapping is stored as a mapping table in a database. The mobile system controller then assigns the local set of communication resources to the mobile base sites located within, or at, the common carrier transportation device. Once the mobile base sites have been configured, the mobile system controller allocates (809) a group (i.e., one or more) of local communication resources to a group of mobile communication units located within the common carrier transportation device in response to requests to communicate received from the group of mobile communication units. Upon allocation of the local resources to the mobile communication units, the mobile system controller receives (811) communications from the group of communication units, queries the mapping table for the appropriate resource mappings, converts the communications onto, or into, a group of communication resources in the first set pursuant to the previously determined mappings, and transmits (813) the communications to the stationary system controller via the appropriate group of communication resources in the first set.

While maintaining communications between the mobile communication units and the stationary system controller, the mobile system controller determines whether one of a variety of possible handoff conditions may have arisen. First, the mobile system controller determines (815) whether a handoff of a communication unit from one mobile base site to another is necessary within the common carrier transportation device. When a handoff within the common carrier transportation device is necessary, the mobile system controller determines a target mobile base site using known handoff techniques and allocates (817) a new local communication resource to the communication unit that is to be handed off, wherein the new local communication resource is logically assigned to the target mobile base site (i.e., the mobile base site serving the coverage area that the communication unit will be entering or has entered). Once the handed off communication unit receives the new resource allocation and begins transmitting via the new resource, the mobile system controller receives (819) the communication from the handed off communication unit via the newly allocated local communication resource and transmits (821) the communication to the stationary system controller via the communication resource identified in the mapping table as corresponding to the newly allocated local resource. The mobile system controller then maintains the communication path of the communication until termination of the communication, unless another handoff within the common carrier transportation device is necessary or one of the other handoff conditions (825, 845) is satisfied.

In addition to determining whether a handoff is necessary within the common carrier transportation device, the mobile system controller determines (825) whether a handoff of the mobile system controller is necessary. As discussed above with regard to FIGS. 1 and 4, known MAHO techniques are preferably employed to determine when a handoff is necessary. When a handoff is necessary, the stationary system controller allocates (827) a new, or third, set of communication resources to the mobile system controller and transmits the allocation to the mobile system controller via a control channel. The new set of communication resources is a subset of the communication resources assigned to the target stationary base site (i.e., the stationary base serving the service coverage area toward, or into, which the common carrier transportation device is traveling). Upon receiving the allocation of the new set of communication resources, the mobile system controller determines (829) whether the current local set (i.e., the second set) of communication resources needs to be changed in response to the upcoming handoff. This determination is preferably accomplished by measuring the stationary base site control signals to determine if any of the current local communication resources will substantially interfere with stationary base site communication resources. If any of the current local communication resources will substantially interfere with stationary base site communication resources, the mobile system controller determines that the current set of local resources must be changed. It should be noted that the change in the set of local resources may result in as few as one local resource actually being updated.

When the current local set of communication resources needs to be changed, the mobile system controller selects (831) the new local set, or fourth set, of communication resources. In a preferred embodiment, the resources in the new local set are distinct from the communication resources assigned to the target stationary base site (including those resources in the third set) and preferably comprise a subset of one or more stationary base sites that are distant from the common carrier transportation device. In addition, the new local set is preferably selected to not substantially interfere with the communication resources of any stationary base site. That is, the new local set is selected to produce sufficiently small signal levels at the stationary base sites, such that transmissions from communication units within the common carrier transportation device do not render ongoing communications within the service coverage areas of the stationary base sites indecipherable. The mobile system controller then maps (833) the third set of communication resources (i.e., the new set allocated to the mobile system controller) to the fourth set of communication resources (i.e., the new local set used within the common carrier transportation device) and stores the mappings in the mapping table.

After receiving the new resource allocation, selecting new local resources, and mapping the new stationary site resources to the new local resources, the mobile system controller allocates (835) a group of the new local set of resources to the group of communication units that were communicating before the handoff. In addition, prior to completion of the handoff and transmissions on the newly allocated resources (both between the mobile system controller and the stationary system controller and between the communication units and the mobile system controller), the stationary system controller preferably establishes (837) the necessary switching connections between the stationary system controller and other entities, such as stationary base sites and switching centers coupled to the PSTN, to facilitate continuation of the ongoing communications after handoff. Because the stationary system controller knows of an upcoming handoff of a group of communications and can determine a direction of travel for the common carrier transportation device based on known techniques as described above with regard to FIGS. 1 and 4, the stationary system controller can establish the necessary switching connections as part of one functional step (i.e., in response to one request to handoff) as opposed to multiple functional steps (i.e., in response to multiple requests to handoff) as in existing cellular-type systems. By having the a priori knowledge of the group handoff, the stationary system controller can equalize its switching load and obviate the switching load surge that accompanies the individual handing off of multiple communication units simultaneously as in existing systems.

Upon allocating the group of new local communication resources to the group of communication units, the mobile system controller receives (839) communication transmissions from the group of communication units via the new local resources. The mobile system controller then transmits (841) the communications to the stationary system controller via a group of the new communication resources allocated by the stationary system controller. The mobile system controller maintains the communication paths of the ongoing communications using the new resources until termination of the communications, unless another handoff of the mobile system controller is necessary or one of the other handoff conditions (815, 845) is satisfied.

When the second, or local, set of communication resources does not need to be changed (829) due to a handoff of the mobile system controller, the mobile system controller maps (843) the new set of resources allocated by the stationary system controller (i.e., the third set) to the current local set of resources and stores the new mappings in the mapping table. The logic flow then continues at block 837 with the only exception being that the mobile system controller receives the communications from the group of communication units via the current local set (second set) of communication resources in block 839 instead of via the new local set (fourth set) as described above.

In addition to determining whether a handoff is necessary within the common carrier transportation device or whether a handoff of the mobile system controller is necessary, the mobile system controller determines (845) whether a handoff of a communication unit is necessary from the mobile system controller to a stationary base site—e.g., when the communication unit exits the common carrier transportation device during a communication. This determination is preferably accomplished using known MAHO techniques to establish that a handoff is necessary from the current local communication resource at the common carrier transportation device to some other communication resource and that none of the other local resources assigned to the mobile base sites provide adequate signal quality to support the handoff.

Once the mobile system controller recognizes that a handoff within the common carrier transportation device is impractical, the mobile system controller requests that the stationary system controller scan for a transmission by the communication unit. Upon locating the communication unit, the stationary base site allocates (847) a new communication resource for the communication unit at the stationary base site to which the communication unit is to be handed off. The new allocation is then conveyed to the communication unit and the communication unit continues transmitting the communication via the newly allocated resource. The stationary system controller then receives (849) the communication from the communication unit via the newly allocated communication resource directly, as opposed to through a mapping as with communications received from the communication units located within the common carrier transportation device. The stationary system controller maintains the communication path of the communication using the new resource until termination of the communication and the mobile system controller continues to determine whether handoff of any other communication is necessary due to one of the handoff conditions (815, 825, 845).

The present invention encompasses a method and apparatus for providing communication service to communication units located within a common carrier transportation device. With this invention, the surge in the switching and control channel activity that normally accompanies mass individual handoffs of commuter communication units, thereby resulting in dropped calls, is obviated by placing a trunking subsystem within the common carrier transportation device that permits the fixed, or stationary, end of the overall system to perform a single group handoff instead of a mass of individual handoffs. In addition, the present invention provides for a priori notice of the group handoff at the fixed end, which permits the fixed end controller to establish the necessary switching connections in advance of the group handoff, thereby further reducing the probability of dropped calls as compared to the existing mass handoff approaches of existing cellular-type systems.

While the present invention has been particularly shown and described with reference to particular embodiments thereof, it will be understood by those skilled in the art that various changes in form and details may be made therein without departing from the spirit and scope of the present invention.

We claim:

1. A method for providing communication service to communication units located within a common carrier transportation device, the method comprising the steps of:

allocating, by a stationary system controller, a first plurality of communication resources to a mobile system controller located at the common carrier transportation device, the first plurality of communication resources being a subset of communication resources assigned to a first stationary base site of a plurality of stationary base sites controlled by the stationary system controller;

mapping, by the mobile system controller, the first plurality of communication resources to a second plurality of communication resources, the second plurality of communication resources being distinct from the first plurality of communication resources;

allocating, by the mobile system controller, at least two communication resources of the second plurality of communication resources to at least two communication units located in the common carrier transportation device to support communications involving the at least two communication units;

determining whether the mobile system controller is to be handed off from the first plurality of communication resources to a third plurality of communication resources, the third plurality of communication resources being a subset of communication resources assigned to a target stationary base site of the plurality of stationary base sites that provides communication service to a service coverage area that is adjacent to a service coverage area serviced by the first stationary base site, and when the mobile system controller is to be handed off, allocating, by the stationary system controller, the third plurality of communication resources substantially simultaneously to the mobile system controller to thereby maintain the communications involving the at least two communication units.

2. The method of claim 1, further comprising the steps of:
    mapping, by the mobile system controller, the third plurality of communication resources to the second plurality of communication resources, the third plurality of communication resources being distinct from the second plurality of communication resources; and
    transmitting, by the mobile system controller, the communications to the stationary system controller via at least two communication resources of the third plurality of communication resources, wherein the at least two communication resources of the third plurality of communication resources map to at least two communication resources of the second plurality of communication resources.

3. The method of claim 1, further comprising the steps of:
    mapping, by the mobile system controller, the third plurality of communication resources to a fourth plurality of communication resources, the fourth plurality of communication resources being distinct from the third plurality of communication resources;
    allocating, by the mobile system controller, at least two communication resources of the fourth plurality of communication resources to the at least two communication units to support the communications, wherein the at least two communication resources of the fourth plurality of communication resources map to at least two communication resources of the third plurality of communication resources; and
    transmitting, by the mobile system controller, the communications to the stationary system controller via the at least two communication resources of the fourth plurality of communication resources.

4. The method of claim 1, wherein the step of determining whether the mobile system controller is to be handed off from the first plurality of communication resources to a third plurality of communication resources further comprises the steps of:
    determining a direction of travel of the common carrier transportation device; and
    establishing, by the stationary system controller, switching connections between the stationary system controller and the target stationary base site prior to handoff of the mobile system controller based on the direction of travel of the common carrier transportation device.

5. The method of claim 1, wherein the step of determining whether the mobile system controller is to be handed off from the first plurality of communication resources to a third plurality of communication resources further comprises the steps of:
    determining a direction of travel of the common carrier transportation device; and
    establishing, by the stationary system controller, switching connections between the stationary system controller and a switching center prior to handoff of the mobile system controller based on the direction of travel of the common carrier transportation device, the switching center providing connectivity between the stationary system controller and a public switched telephone network.

6. The method of claim 1, further comprising the steps of:
    mapping, by the mobile system controller, the third plurality of communication resources to a fourth plurality of communication resources, the fourth plurality of communication resources being a subset of communication resources assigned to at least a third stationary base site of the plurality of stationary base sites controlled by the stationary system controller, wherein the at least a third stationary base site does not include the target stationary base site;
    allocating, by the mobile system controller, at least two communication resources of the fourth plurality of communication resources to the at least two communication units to support the communications involving the at least two communication units; and receiving, at the mobile system controller, the communications from the at least two communication units via the at least two communication resources of the fourth plurality of communication resources.

7. The method of claim 1, further comprising the steps of:

determining whether a communication unit of the at least two communication units is to be handed off from a first communication resource of the second plurality of communication resources to a second communication resource of the second plurality of communication resources;

when the communication unit is to be handed off, allocating, by the mobile system controller, the second communication resource of the second plurality of communication resources to the communication unit; and transmitting, by the communication unit, a communication to the mobile system controller via the second communication resource of the second plurality of communication resources.

8. The method of claim 1, further comprising the steps of:

determining whether a communication unit of the at least two communication units is to be handed off from a first communication resource of the second plurality of communication resources to a second communication resource assigned to a stationary base site, the second communication resource being distinct from the communication resources in the second plurality of communication resources;

when the communication unit is to be handed off, allocating, by the stationary system controller, the second communication resource to the communication unit; and transmitting, by the communication unit, a communication to the stationary system controller via the second communication resource.

9. The method of claim 1, wherein the step of allocating a first plurality of communication resources further comprises the step of transmitting an identification of the first stationary base site to the mobile system controller and wherein the step of mapping the first plurality of communication resources to a second plurality of communication resources comprises the step of selecting, by the mobile system controller, the second set of communication resources based on the identification of the first stationary base site.

10. The method of claim 1, wherein the step of mapping the first plurality of communication resources to a second plurality of communication resources further comprises the step of:

selecting, by the mobile system controller, a plurality of communication resources that do not substantially interfere with at least the first plurality of communication resources to produce the second plurality of communication resources.

11. The method of claim 10, wherein the step of selecting further comprises the steps of:

receiving, at the mobile system controller, a control signal from at least some of the at least a second stationary base site;

measuring received signal quality of each control signal; and selecting a plurality of communication resources that do not substantially interfere with the first plurality of communication resources and that do not substantially interfere with communication resources assigned to a stationary base site of the at least a second stationary base site associated with a control signal having a received signal quality above a predetermined threshold.

12. A method for providing communication service to communication units located within a common carrier transportation device, the method comprising the steps of:

allocating, by a stationary system controller, a first plurality of communication resources to a mobile system controller located at the common carrier transportation device, the first plurality of communication resources being a subset of communication resources assigned to a first stationary base site of a plurality of stationary base sites controlled by the stationary system controller;

selecting, by the mobile system controller, a second plurality of communication resources, the second plurality of communication resources being distinct from the first plurality of communication resources;

mapping, by the mobile system controller, the first plurality of communication resources to the second plurality of communication resources;

allocating, by the mobile system controller, at least two communication resources of the second plurality of communication resources to at least two communication units located in the common carrier transportation device to support communications involving the at least two communication units;

receiving, at the mobile system controller, the communications via the at least two communication resources of the second plurality of communication resources;

transmitting, by the mobile system controller, the communications to the stationary system controller via at least two communication resources of the first plurality of communication resources;

determining whether the mobile system controller is to be handed off from the first plurality of communication resources to a third plurality of communication resources, the third plurality of communication resources being a subset of communication resources assigned to a third stationary base site of the plurality of stationary base sites;

when the mobile system controller is to be handed off, allocating, by the stationary system controller, the third plurality of communication resources substantially simultaneously to the mobile system controller to thereby maintain the communications involving the at least two communication units; and transmitting, by the mobile system controller, the communications to the stationary system controller via at least two communication resources of the third plurality of communication resources.

13. The method of claim 12, wherein the step of allocating the third plurality of communication resources to the mobile system controller further comprises the steps of:

mapping, by the mobile system controller, the third plurality of communication resources to a fourth plurality of communication resources, the fourth plurality of communication resources being a subset of communication resources assigned to at least a fourth stationary base site of the plurality of stationary base sites controlled by the stationary system controller;

allocating, by the mobile system controller, at least two communication resources of the fourth plurality of communication resources to the at least two communication units to support the communications involving the at least two communication units; and receiving, at the mobile system controller, the communications from the at least two communication units via the at least two communication resources of the fourth plurality of communication resources.

14. The method of claim 12, wherein the step of selecting a second plurality of communication resources further comprises the step of:

selecting a plurality of communication resources that do not substantially interfere with at least the first plurality of communication resources to produce the second plurality of communication resources.

15. A method for a mobile system controller located at a common carrier transportation device to provide communication service to communication units located within the common carrier transportation device, the method comprising the steps of:

receiving an allocation of a first plurality of communication resources from a stationary system controller, the first plurality of communication resources being a subset of communication resources assigned to a first stationary base site of a plurality of stationary base sites controlled by the stationary system controller;

mapping the first plurality of communication resources to a second plurality of communication resources, the second plurality of communication resources being distinct from the first plurality of communication resources allocating at least two communication resources of the second plurality of communication resources to at least two communication units located within the common carrier transportation device to support communications involving the at least two communication units;

determining whether the mobile system controller is to be handed off from the first plurality of communication resources to a third plurality of communication resources, the third plurality of communication resources being a subset of communication resources assigned to a target stationary base site of the plurality of stationary base sites that provides communication service to a service coverage area that is adjacent to a service coverage area serviced by the first stationary base site;

when the mobile system controller is to be handed off, receiving an allocation of the third plurality of communication resources substantially simultaneously from the stationary system controller to thereby maintain the communications involving the at least two communication units; and transmitting the communications to the stationary system controller via at least two communication resources of the third plurality of communication resources.

16. The method of claim 15, further comprising the steps of:

receiving the communications via the at least two communication resources of the second plurality of communication resources; and transmitting the communications to the stationary system controller via at least two communication resources of the first plurality of communication resources.

17. The method of claim 15, wherein the step of receiving an allocation of the third plurality of communication resources from the stationary system controller further comprises the steps of:

mapping the third plurality of communication resources to a fourth plurality of communication resources, the fourth plurality of communication resources being a subset of communication resources assigned to at least a third stationary base site of the plurality of stationary base sites controlled by the stationary system controller, wherein the at least a third stationary base site does not include the target stationary base site;

allocating at least two communication resources of the fourth plurality of communication resources to the at least two communication units to support the communications involving the at least two communication units; and receiving the communications from the at least two communication units via the at least two communication resources of the fourth plurality of communication resources.

18. The method of claim 15, further comprising the steps of:

determining whether a communication unit of the at least two communication units is to be handed off from a first communication resource of the second plurality of communication resources to a second communication resource of the second plurality of communication resources;

when the communication unit is to be handed off, allocating the second communication resource of the second plurality of communication resources to the communication unit; and receiving a communication from the communication unit via the second communication resource of the second plurality of communication resources.

19. The method of claim 15, wherein the step of receiving an allocation of a first plurality of communication resources from a stationary system controller further comprises the step of receiving an identification of the first stationary base site and wherein the step of mapping the first plurality of communication resources to a second plurality of communication resources further comprises the step of selecting the second plurality of communication resources based on the identification of the first stationary base site.

20. The method of claim 15, wherein the step of mapping the first plurality of communication resources to a second plurality of communication resources further comprises the step of selecting a plurality of communication resources that do not substantially interfere with at least the first plurality of communication resources to produce the second plurality of communication resources.

21. The method of claim 15, wherein the step of mapping the first plurality of communication resources to a second plurality of communication resources further comprises the steps of:

receiving a control signal from at least some of the at least a second stationary base site;

measuring received signal quality of each control signal; and selecting a plurality of communication resources that do not substantially interfere with the first plurality of communication resources and that do not substantially interfere with communication resources assigned to a stationary base site of the at least a second stationary base site that is associated with a control signal having a received signal quality above a predetermined threshold.

22. A method for a stationary system controller to provide communication service to communication units located within a common carrier transportation device, the method comprising the steps of:

allocating a first set of communication resources to a mobile system controller located at the common carrier transportation device, the first set of communication resources being a subset of communication resources assigned to a first stationary base site of a plurality of stationary base sites controlled by the stationary system controller;

receiving communications of at least two communication units located within the common carrier transportation device from the mobile system controller via at least two communication resources of the first set;

determining a direction of travel of the common carrier transportation device;

determining whether the mobile system controller is to be handed off from the first set of communication resources to a second set of communication resources, the second set of communication resources being a subset of communication resources assigned to a second stationary base site of the plurality of stationary base sites;

establishing switching connections between the stationary system controller and the second stationary base site prior to handoff of the mobile system controller based on the direction of travel of the common carrier transportation device;

when the mobile system controller is to be handed off, allocating the second set of communication resources substantially simultaneously to the mobile system controller to thereby maintain the communications involving the at least two communication units; and receiving the communications from the mobile system controller via at least two communication resources of the second set.

23. The method of claim 22, further comprising the step of:

establishing switching connections between the stationary system controller and a switching center prior to handoff of the mobile system controller based on the direction of travel of the common carrier transportation device, the switching center providing connectivity between the stationary system controller and a public switched telephone network.

24. The method of claim 22, further comprising the steps of:

determining whether a communication unit of the at least two communication units is to be handed off from a first communication resource of the first set to a second communication resource assigned to a stationary base site, the second communication resource being distinct from the communication resources in the first set;

when the communication unit is to be handed off, allocating the second communication resource to the communication unit; and receiving a communication from the communication unit via the second communication resource.

* * * * *